US012645403B2

(12) United States Patent
Lee

(10) Patent No.: US 12,645,403 B2
(45) Date of Patent: Jun. 2, 2026

(54) STORAGE DEVICE DETERMINING TRANSMIT SPEED OF DATA UNIT BASED ON WORKLOAD AND OPERATING METHOD THEREOF

(71) Applicant: SK hynix Inc., Gyeonggi-do (KR)

(72) Inventor: Joo Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/792,551

(22) Filed: Aug. 2, 2024

(65) Prior Publication Data

US 2025/0328286 A1 Oct. 23, 2025

(30) Foreign Application Priority Data

Apr. 18, 2024 (KR) ........................ 10-2024-0051966

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G11C 16/10; G11C 11/5628
See application file for complete search history.

(56) References Cited

U.S. PATENT DOCUMENTS

2021/0034283 A1* 2/2021 Jung ...................... G06F 3/0655
2021/0255768 A1* 8/2021 Majerus ................ G06F 3/0653

FOREIGN PATENT DOCUMENTS

KR 10-2022-0016762 A 2/2022
KR 10-2022-0087231 A 6/2022

* cited by examiner

*Primary Examiner* — Francisco A Grullon
(74) *Attorney, Agent, or Firm* — IP & T GROUP LLP

(57) ABSTRACT

A storage device may include a memory and a controller. The memory may include a plurality of memory units. The controller may externally receive a data unit and a write command for storing the data unit in the memory, determine workload based on at least one of the write command and the data unit, determine a speed of transmitting the data unit to the memory based on the determined workload, and transmit the data unit to the memory at the determined speed. The controller may determine the speed as a first speed upon determination that the workload is a first workload, and to determine the speed as a second speed upon determination that the workload is a second workload.

14 Claims, 10 Drawing Sheets

STORAGE DEVICE DETERMINING TRANSMIT SPEED OF DATA UNIT BASED ON WORKLOAD AND OPERATING METHOD THEREOF

CROSS-REFERENCES TO RELATED APPLICATION

The present application claims priority under 35 U.S.C. 119(a) to Korean patent application number 10-2024-0051966 filed on Apr. 18, 2024, which is incorporated herein by reference in their entirety.

BACKGROUND

1. Technical Field

Various embodiments of the present disclosure generally relate to a storage device determining transmit speed of a data unit based on workload, and operating method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

When the controller writes data to the memory, the performance of a data write operation may be determined by a speed at which data is transmitted to the memory and the time at which the data transmitted to the memory is programmed. If the speed at which data is transmitted to the memory is increased to improve the performance of the data write operation, an amount of power consumed may increase.

SUMMARY

Various embodiments of the present disclosure are directed to provide a storage device capable of reducing an amount of power consumed during a data write operation while maintaining data write performance, and a method of operating the same.

In an embodiment of the present disclosure, a storage device may include a memory including a plurality of memory units; and a controller configured to externally receive a data unit and a write command for storing the data unit in the memory, determine workload based on at least one of the write command and the data unit, determine a speed of transmitting the data unit to the memory based on the determined workload, and transmit the data unit to the memory at the determined speed.

The controller may determine the speed as a first speed upon determination that the workload is a first workload, and determine the speed as a second speed upon determination that the workload is a second workload.

In another embodiment of the present disclosure, an operating method of a storage device may include writing a data unit in a memory including a plurality of memory units; determining workload based on at least one of a write command externally received and the data unit written to the memory; determining a speed of transmitting the data unit based on the determined workload; and transmitting the data unit to the memory at the determined speed.

The determining the speed may include determining the speed as a first speed upon determination that the workload is a first workload, and determining the speed as a second speed upon determination that the workload is a second workload.

According to embodiments of the present disclosure, it is possible to reduce an amount of power consumed during data write operations while maintaining data write performance.

DETAIL DESCRIPTION

Figure 1:
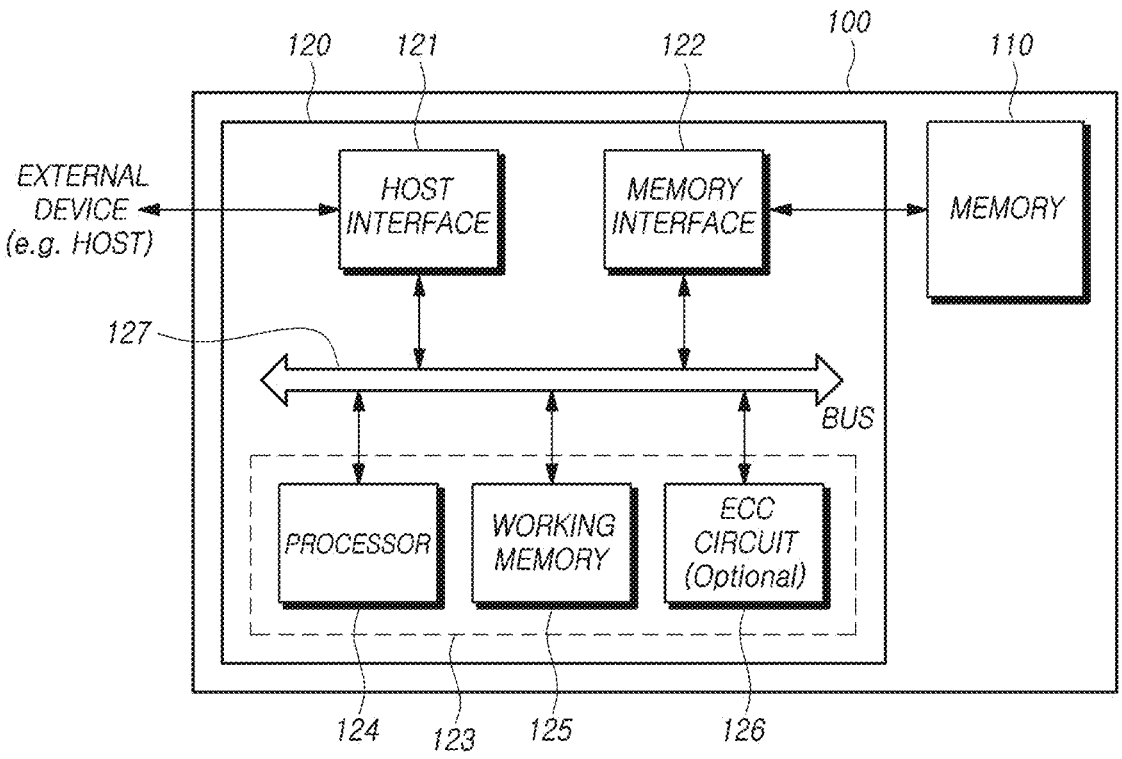
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiments of the present disclosure may be embodied in different forms and variations and should not be construed as being limited to an embodiment set forth herein. Rather, the described embodiments are provided so that this disclosure will be thorough and complete, and will fully convey the scope of the present disclosure to those skilled in the art to which this disclosure pertains. Throughout the present disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memories such as a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array, which is selected by the address. The memory 110 may perform an operation instructed by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless of a request from the host.

The host may be a computer, an ultra mobile PC (UMPC), a workstation, a personal digital assistant (PDA), a tablet, a mobile phone, a smartphone, a wearable device, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, a radio frequency identification (RFID) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 may provide an interface that uses at least one of various communication standards or interfaces such as a universal serial bus (USB) protocol, a multimedia card (MMC) protocol, a peripheral component interconnection (PCI) protocol, a PCI-express (PCIe) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol and a private protocol.

When receiving a request from the host, the control circuit 123 may receive the request through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform the general control operations of the controller 120 to control operations of the memory 110. To this end, for instance, the control circuit 123 may include a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control operations of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware is a program to be executed in the storage device 100 to drive the storage device 100, and may include various functional layers. For example, the firmware may include binary data in which codes for executing the functional layers, respectively, are defined.

For example, the firmware may include at least one of a flash translation layer (FTL), a host interface layer (HIL), and a flash interface layer (FIL). The flash translation layer may perform a translating function between a logical address requested to the storage device 100 from the host and a physical address of the memory 110. The host interface layer may serve to analyze a command requested to the storage device 100 from the host, and transfer the command to the flash translation layer. The flash interface layer may transfer, to the memory 110, a command, instructed from the flash translation layer.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata is data for managing the memory 110, and may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of a static RAM (SRAM), a dynamic RAM (DRAM) and a synchronous DRAM (SDRAM). The controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page which is a read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in the last read data. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
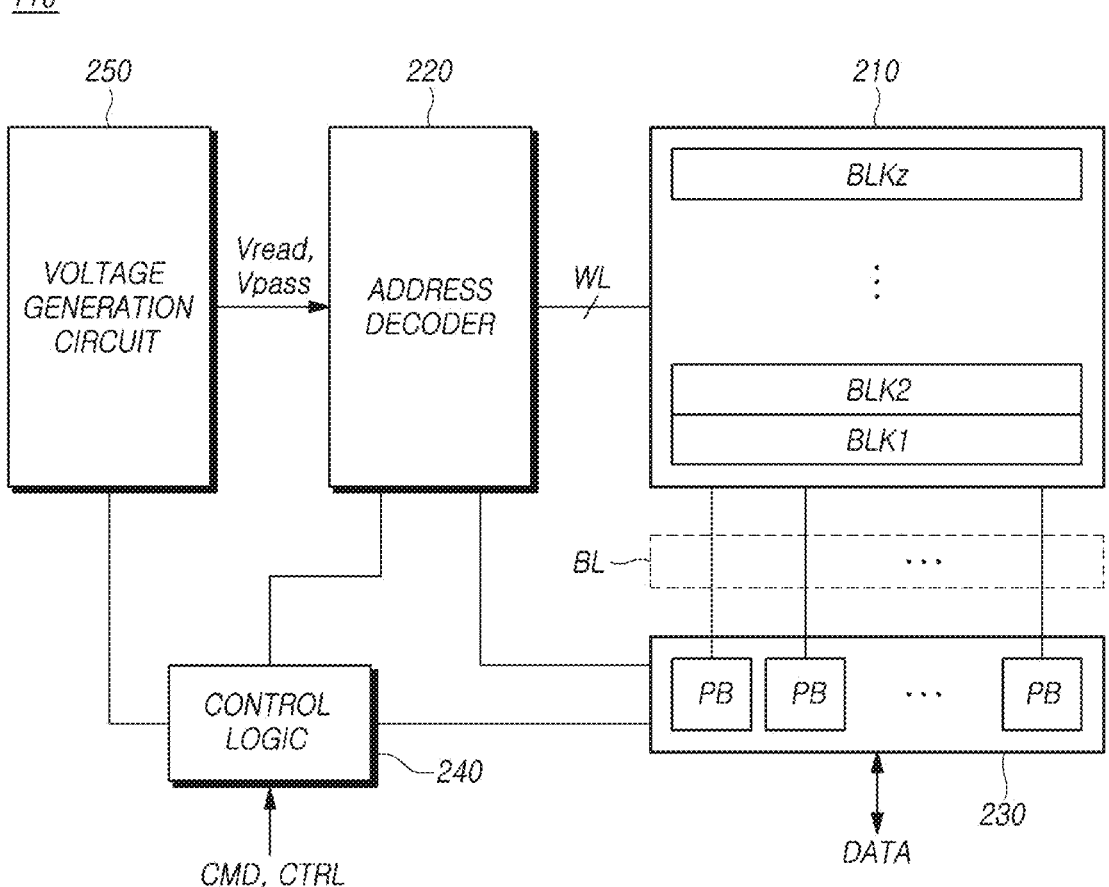
FIG. 2 is a block diagram schematically illustrating a memory of FIG. 1.

FIG. 2 is a block diagram schematically illustrating the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 under the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
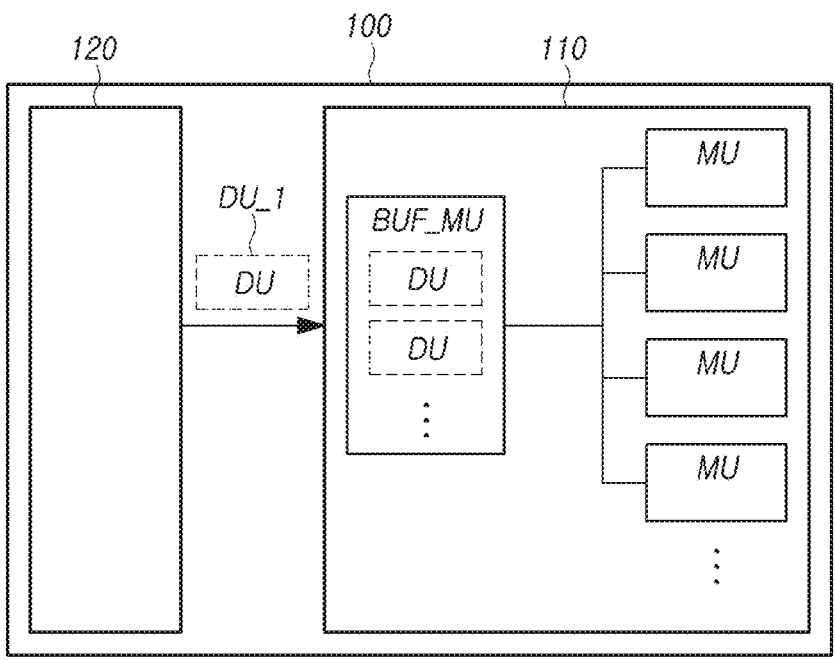
FIG. 3 is a diagram showing a schematic structure of a storage device according to an embodiment of the present disclosure.

FIG. 3 is a diagram showing schematic structure of a storage device 100 according to an embodiment of the present disclosure.

Referring to FIG. 3, the storage device 100 may include a memory 110 and a controller 120. The memory 110 and the controller 120 of FIG. 3 may correspond to the memory 110 and the controller 120 of FIG. 1.

The memory 110 may include a plurality of memory units MU. The memory 110 may selectively include a buffer memory unit BUF_MU storing a plurality of data units DU. The plurality of data units DU may be stored in the buffer memory unit BUF_MU and then written to one or more of the plurality of memory units MU.

For example, each of the plurality of memory units MU may be a memory block included in the memory 110 or a page included in the memory block. In another embodiment, each of the plurality of memory units MU may be a plane or die including a plurality of memory blocks.

Each of the data units DU may be data of a fixed size. The size of each data unit may be determined based on the size of each memory unit. For example, when a memory unit is a page, the size of the data unit may be a size of the page (e.g. 4 KB).

The buffer memory unit BUF_MU may store the data units DU. When the operation of writing the stored data units DU to the plurality of memory units MU is completed, the memory 110 may delete data units DU stored in the buffer memory unit BUF_MU from the buffer memory unit BUF_MU.

The buffer memory unit BUF_MU may be configured in various ways. For example, the buffer memory unit BUF_MU may be configured as a memory block including a single level cell (SLC) or a page included in the memory block. As another example, the buffer memory unit BUF_MU may be configured as a volatile memory that temporarily stores the data units DU.

The buffer memory unit BUF_MU may be used to improve data write performance by overlapping the operation of writing an already stored data unit in the plurality of memory units MU and the operation of receiving a new data unit from the controller 120.

The controller 120 may receive, from a host outside the storage device 100, the data units DU and a write command to store the data units DU in the memory 110. The controller 120 may determine workload based on at least one of the received write command and the data unit written to the memory 110. Additionally, the controller 120 may determine a speed of transmitting the data units DU to the memory 110 based on the determined workload.

In FIG. 3, the controller 120 may determine the speed of transmitting the first data unit DU_1, which is one of the data units DU, to the memory 110 based on the determined workload. The controller 120 may transmit the first data unit DU_1 to the memory 110 at the determined speed.

For example, the controller 120 may determine the workload based on a pattern of data units written to the memory 110 during a predetermined time period.

As another example, the controller 120 may determine the workload based on a size of a data unit requested by the host to be written.

As another example, the controller 120 may determine the workload based on the number of write commands transmitted by the host.

The pattern of data units written to the memory 110 may indicate information about the history of the data units being written to the memory 110. The workload may indicate the characteristics of the operation performed on the memory 110.

For example, the controller 120 may determine the speed as a first speed upon determination that the workload is a first workload, and determine the speed as a second speed upon determination that the workload is a second workload. Hereinafter, this will be described in detail in FIG. 4.

Figure 4:
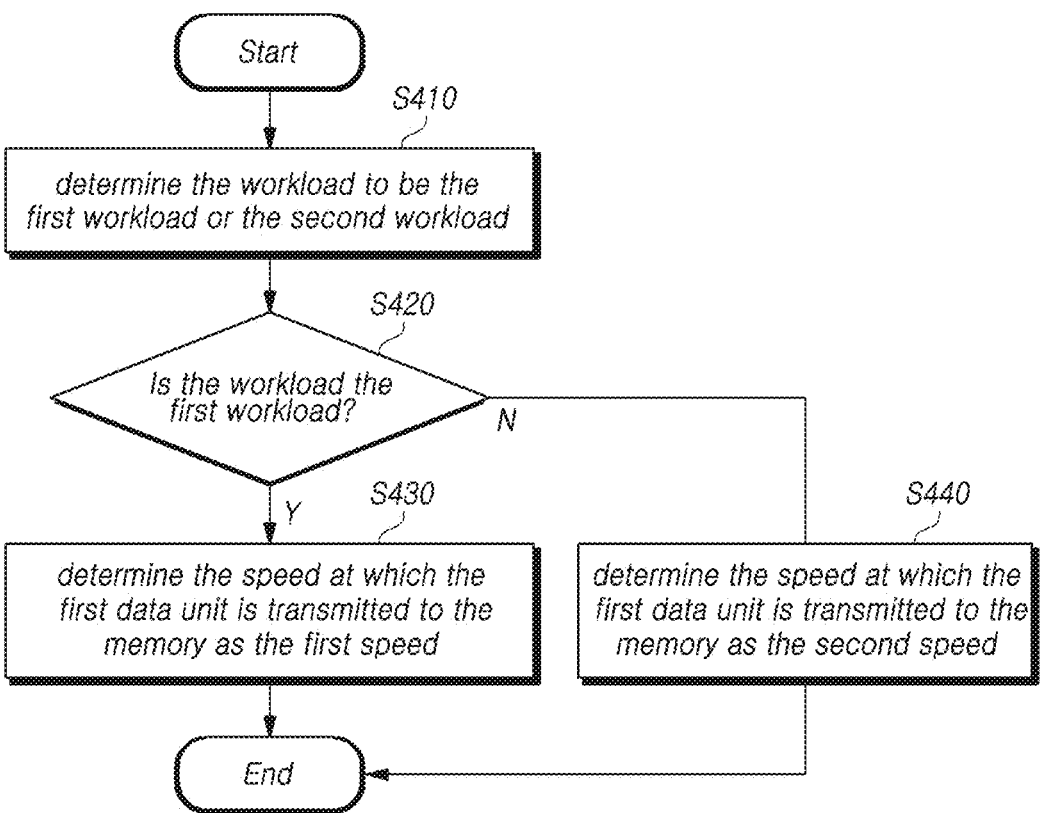
FIG. 4 is a flowchart showing an operation in which a storage device determines a speed of transmitting a first data unit according to an embodiment of the present disclosure.

FIG. 4 is a flowchart showing an operation in which a storage device 100 determines the speed of transmitting a first data unit DU_1 according to an embodiment of the present disclosure.

Referring to FIG. 4, the controller 120 of the storage device 100 may determine the workload to be the first workload or the second workload (at operation S410).

Then, the controller 120 may determine whether the workload determined in the operation S410 is the first workload (at operation S420).

When the workload is the first workload (i.e., "Y" in the operation S420), the controller 120 may determine the speed at which the first data unit DU_1 is transmitted to the memory 110 as the first speed (at operation S430).

On the other hand, when the workload is the second workload rather than the first workload (i.e., "N" in the operation S420), the controller 120 may determine the speed of transmitting the first data unit DU_1 to the memory 110 as the second workload (at operation S440). The second speed is faster than the first speed.

In this way, depending on the workload, the controller 120 may determine the speed of transmitting the first data unit DU_1 to the memory 110 differently. This is for, when the workload does not cause actual data write performance degradation even if the first data unit DU_1 is transmitted slowly to the memory 110, reducing power consumption by decreasing the speed at which the first data unit DU_1 is transmitted to the memory 110.

To determine the speed at which the first data unit DU_1 is transmitted to the memory 110, the controller 120 may store information about the speed in a register (now shown) inside the controller 120. The controller 120 may transmit the first data unit DU_1 to the memory 110 according to the information about the speed stored in the register (not shown).

In an embodiment of the present disclosure, the controller 120 of the storage device 100 may determine the workload based on at least one of the number of consecutively received write commands and the number of consecutively transmitted data units to the memory 110.

For example, the controller 120 may determine the workload as the first workload upon determination that the number of consecutively transmitted data units DU to the memory 110 is equal to or greater than a threshold number.

As another example, the controller 120 may determine the workload as the first workload upon determination that the number of consecutively received write commands is equal to or greater than a threshold number.

Hereinafter, a specific method by which the controller 120 of the storage device 100 determines the workload will be described.

Figure 5:
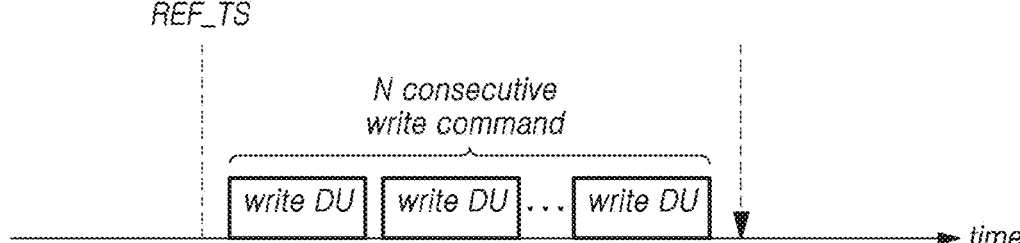
FIG. 5 is a diagram showing how a storage device determines workload according to an embodiment of the present disclosure.

FIG. 5 is a diagram showing how a storage device 100 determines workload according to an embodiment of the present disclosure.

Referring to FIG. 5, the controller 120 of the storage device 100 may determine the workload based on the number of consecutively transmitted data units DU to the memory 110.

For example, the controller 120 may determine the workload based on the number N of data units DU consecutively transmitted to the memory 110 from reference time point REF_TS. The reference time point REF_TS may be, for example, a time point at which a write request transmitted by a host outside the storage device 100 begins to be processed.

The number N of data units DU consecutively transmitted to the memory 110 may be determined based on a size of data requested to be written by the host outside the storage device 100. For example, when the size of data requested by the host to be written is N times the size of the data unit, N data units may be consecutively transmitted to the memory 110. If the size of the data unit is 4 KB and the size of data requested by the host to be written is 4 MB, 1024 data units are consecutively written to the memory 110.

Figure 6:
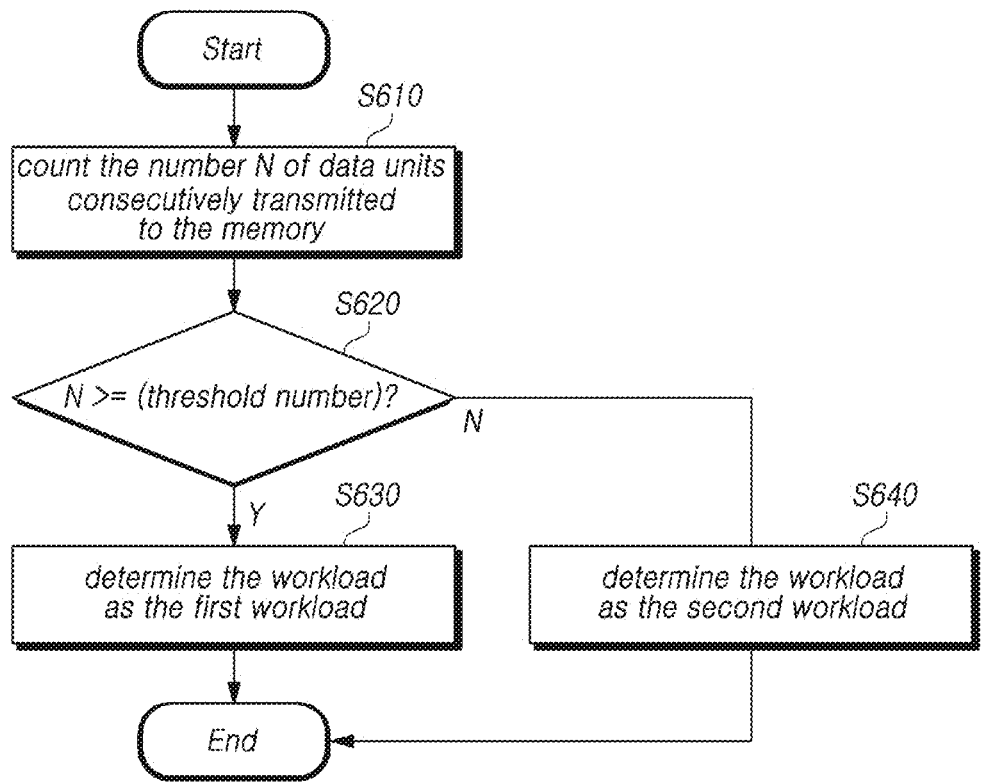
FIG. 6 is a flowchart showing an operation in which a storage device determines workload according to an embodiment of the present disclosure.

FIG. 6 is a flowchart showing an operation in which a storage device 100 determines workload according to an embodiment of the present disclosure.

Referring to FIG. 6, the controller 120 of the storage device 100 may count the number N of data units consecutively transmitted to the memory 110 (at operation S610).

The controller 120 may determine whether N counted in the operation S610 is equal to or greater than a threshold number (at operation S620).

When N is equal to or greater than the threshold number (i.e., "Y" in the operation S620), the controller 120 may determine the workload as the first workload (at operation S630).

On the other hand, when N is less than the threshold number (i.e., "N" in the operation S620), the controller 120 may determine the workload as the second workload (at operation S640).

After determining the workload as the first workload, the storage device 100 may change the workload back to the second workload if a specific condition is satisfied.

Figure 7:
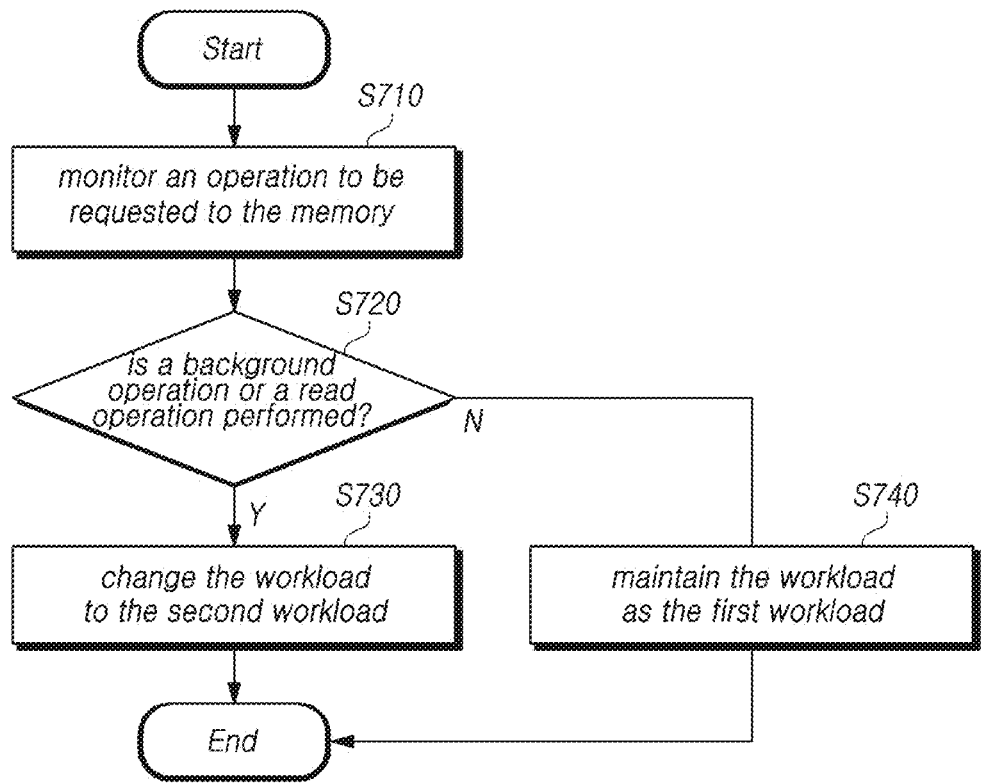
FIG. 7 is a flowchart showing an operation in which a storage device changes workload from a first workload to a second workload according to an embodiment of the present disclosure.

FIG. 7 is a flowchart showing an operation in which a storage device 100 changes the workload from a first workload to a second workload according to an embodiment of the present disclosure.

Referring to FIG. 7, the controller 120 of the storage device 100 may monitor an operation to be requested to the memory 110 while the workload is the first workload (at operation S710).

The controller 120 may determine whether to perform a background operation on the memory 110 or an operation for reading a data unit written to the memory 110 while the workload is the first workload (at operation S720).

The background operation may be garbage collection, wear leveling or read reclaim. The operation of reading the data unit stored in the memory 110 may be a read operation requested from the host.

When performing a background operation on the memory 110 or reading a data unit written to the memory 110 while the workload is the first workload (i.e., "Y" in the operation S720), the controller 120 may change the workload to the second workload (at operation S730). Accordingly, the controller 120 may increase the speed of the transmitting the data unit to be written to the memory 110 again.

On the other hand, when the operation of performing a background operation on the memory 110 and the operation of reading the data unit written on the memory 110 are not performed (i.e., "N" in the operation S720), the controller 120 may maintain the workload as the first workload (at operation S740).

Figure 8:
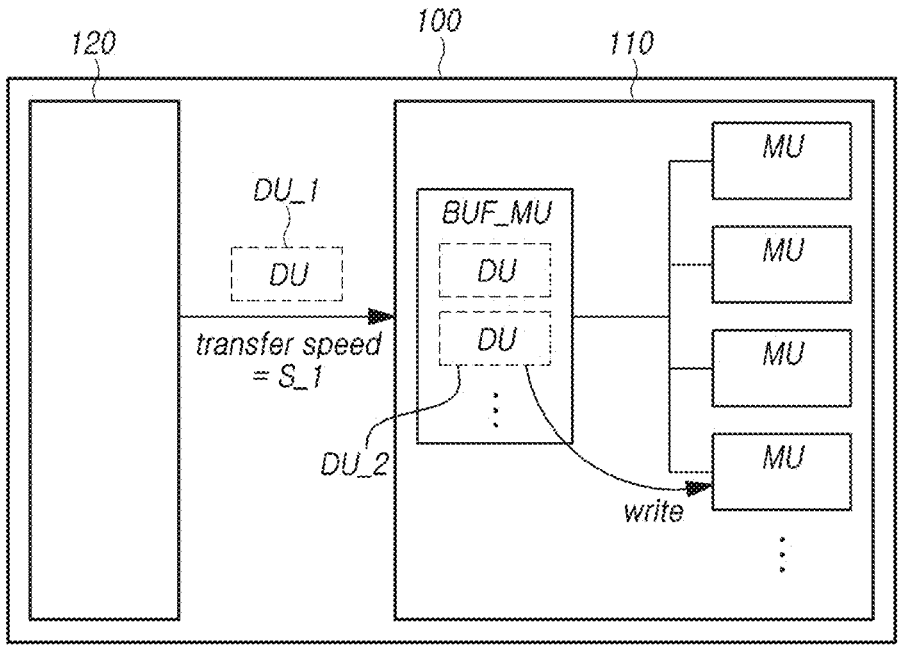
FIG. 8 is a diagram showing an operation performed by a storage device when a workload is a first workload according to an embodiment of the present disclosure.

FIG. 8 is a diagram showing an operation performed by a storage device 100 when the workload is a first workload according to an embodiment of the present disclosure.

As described above, when the workload is the first workload, the controller 120 of the storage device 100 may transmit the first data unit DU_1 to the memory 110 at the first speed S_1.

In this case, the controller 120 may transmit the first data unit DU_1 to the memory 110 at the first speed S_1, during a time period in which the memory 110 configures the written data unit by storing a second data unit DU_2, which is one or more of the data units DU stored in the buffer memory unit BUF_MU, in one or more of the plurality of memory units MU.

That is, the operation of the controller 120 transmitting the first data unit DU_1 to the memory 110 and the operation of the memory 110 writing the second data unit DU_2 may overlap with each other. The memory 110 may write the second data unit DU_2 in only one of the plurality of memory units MU, or may write the second data unit DU_2 distributed across two or more of the plurality of memory units MU.

Figure 9:
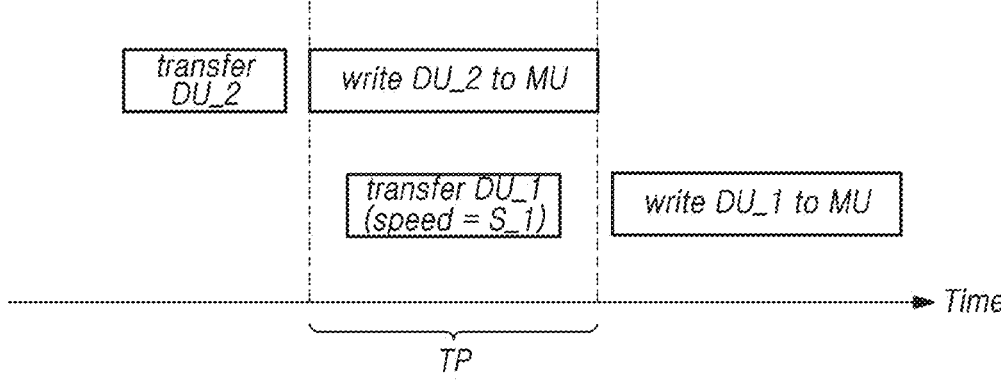
FIG. 9 is a diagram showing an operation in which a storage device writes a first data unit and a second data unit according to an embodiment of the present disclosure.

FIG. 9 is a diagram showing an operation in which a storage device 100 writes a first data unit DU_1 and a second data unit DU_2 according to an embodiment of the present disclosure.

Referring to FIG. 9, the controller 120 of the storage device 100 may transmit the second data unit DU_2 to the memory 110. The second data unit DU_2 transmitted to the memory 110 may be temporarily stored in the buffer memory unit BUF_MU included in the memory 110.

The speed at which the second data unit DU_2 is transmitted to the memory 110 may be the first speed or the second speed.

Afterwards, the memory 110 may write the second data unit DU_2 stored in the buffer memory unit BUF_MU to one or more of the plurality of memory units MU included in the memory 110. The memory 110 may write the second data unit DU_2 to one or more of the plurality of memory units MU during a predetermined time period TP. The length of the time period TP may be a fixed value.

The controller 120 may transmit the first data unit DU_1 to the memory 110 at the first speed S_1 within the time period TP. By storing the first data unit DU_1 in the buffer memory unit BUF_MU before the writing operation of the second data unit DU_2 is completed, data write performance is maintained by immediately starting the writing operation of the first data unit DU_1 without delay after completing the writing operation of the second data unit DU_2.

Therefore, the controller 120 may determine the first speed S_1 at which the first data unit DU_1 is transmitted to the memory 110 so that the first data unit DU_1 can be stored in the buffer memory unit BUF_MU within the time period TP.

In this case, the memory 110 may execute in parallel an operation of storing the first data unit DU_1 received from the controller 120 to the buffer memory unit BUF_MU and an operation of storing the second data unit DU_2 stored in the buffer memory unit BUF_MU in one or more of the plurality of memory units MU.

Afterwards, the memory 110 may write the first data unit DU_1 stored in the buffer memory unit BUF_MU to one or more of the plurality of memory units MU included in the memory 110.

Figure 10:
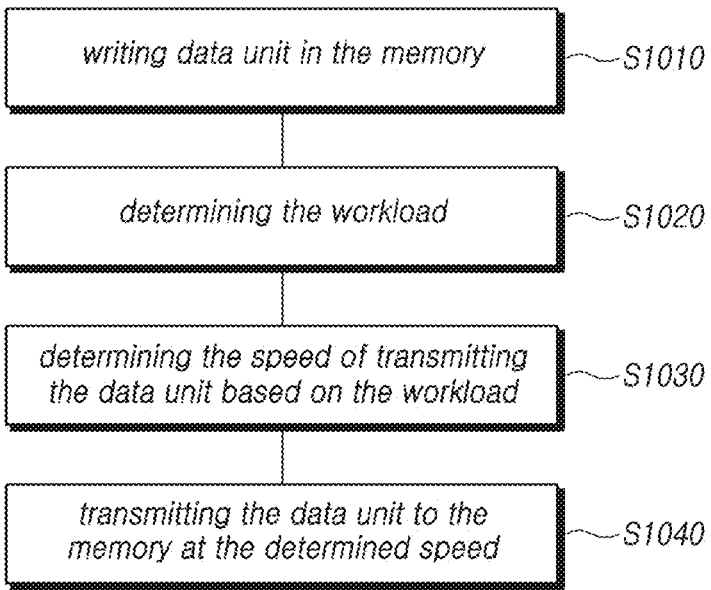
FIG. 10 is a flowchart showing a method of operating a storage device according to an embodiment of the present disclosure.

FIG. 10 is a flowchart showing a method of operating a storage device 100 according to an embodiment of the present disclosure.

Referring to FIG. 10, the operating method of the storage device 100 may include writing data unit in the memory 110 including the plurality of memory units MU (at operation S1010).

The operating method of the storage device 100 may include determining the workload based on at least one of a write command received from the host and the data unit written to the memory 110 (at operation S1020).

For example, the operation S1020 may determine the workload based on at least one of the number of consecutively received write commands and the number of consecutively transmitted data units to the memory 110.

The operation S1020 may determine the workload as the first workload upon a determination that the number of consecutively transmitted data units to the memory 110 is equal to or greater than a threshold number.

The operation S1020 may determine the workload as the first workload upon a determination that the number of consecutively received write commands is equal to or greater than a threshold number.

For example, the operation S1020 may change the determined workload to the second workload when performing a background operation on the memory 110 while the determined workload is the first workload or reading the written data unit.

The operating method of the storage device 100 may include determining the speed of transmitting the data unit based on the workload determined in the operation S1020 (at operation S1030).

The operation S1030 determines the speed as the first speed upon a determination that the workload is the first workload, and determines the speed as the second speed upon a determination that the workload is the second workload.

The operating method of the storage device 100 may include transmitting the data unit to the memory at the speed determined in the operation S1030 (at operation S1040).

For example, the memory 110 may include the buffer memory unit BUF_MU for storing the data units DU. The operation S1040 may transmit, when the determined workload is the first workload, the data unit to the memory 110 at the first speed, during the time period TP in which the memory configures the written data unit by storing one or more of the data units stored in the buffer memory unit BUF_MU in one or more of the plurality of memory units MU.

The data unit may be transmitted to the memory 110 within the time period TP.

In this case, the operation of storing the data unit in the buffer memory unit BUF_MU and the operation of storing another data unit stored in the buffer memory unit BUF_MU in one or more of the plurality of memory units MU may be executed in parallel.

Although embodiments of the present disclosure have been described for illustrative purposes, those skilled in the art will appreciate that various modifications, additions and substitutions are possible, without departing from the scope and spirit of the present disclosure. Therefore, an embodiment disclosed above and in the accompanying drawings should be considered in a descriptive sense only and not for limiting the technological scope. The technological scope of the present disclosure is not limited by an embodiment and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A storage device comprising:
a memory including a plurality of memory units; and
a controller configured to
    externally receive a data unit and a write command for storing the data unit in the memory,
    determine a workload based on at least one of the write command and the data unit,
    determine a speed of transmitting the data unit to the memory based on the determined workload, and
    transmit the data unit to the memory at the determined speed;
wherein the controller is configured to:
determine the speed as a first speed upon determination that the workload is a first workload; and
determine the speed as a second speed upon determination that the workload is a second workload,
wherein the controller is configured to determine the workload based on at least one of a number of write commands received consecutively in command sequence and a number of data units transmitted consecutively to the memory.

2. The storage device according to claim 1,
wherein the controller is configured to determine the workload as the first workload upon determination that the number of consecutively transmitted data units to the memory is equal to or greater than a threshold number.

3. The storage device according to claim 1,
wherein the controller is configured to determine the workload as the first workload upon determination that the number of consecutively received write commands is equal to or greater than a threshold number.

4. The storage device according to claim 1,
wherein the controller is configured to change the determined workload to the second workload when performing, while the determined workload is the first workload, a background operation on the memory or reading the written data unit.

5. The storage device according to claim 1,
wherein the memory includes a buffer memory unit for storing the data unit, and
wherein the controller is configured to, when the determined workload is the first workload, transmit the data unit to the memory at the first speed during a time period in which the memory configures the written data unit by storing, in one or more of the plurality of memory units one or more of the data units stored in the buffer memory unit.

6. The storage device according to claim 5,
wherein the controller is configured to transmit the data unit to the memory within the time period.

7. The storage device according to claim 6,
wherein the memory is configured to execute in parallel a first operation of storing the data unit received from the controller in the buffer memory unit and a second operation of storing the data unit stored in the buffer memory unit in one or more of the plurality of memory units.

8. An operating method of a storage device, the operating method comprising:
writing a data unit in a memory including a plurality of memory units;
determining a workload based on at least one of a write command externally received and the data unit written to the memory;
determining a speed of transmitting the data unit based on the determined workload; and
transmitting the data unit to the memory at the determined speed;
wherein the determining the speed includes:
determining the speed as a first speed upon determination that the workload is a first workload; and
determining the speed as a second speed upon determination that the workload is a second workload,
wherein the determining the workload determines the workload based on at least one of a number of write commands received consecutively in command sequence and a number of data units transmitted consecutively to the memory.

9. The method according to claim 8,
wherein the determining the workload determines the workload as the first workload upon determination that the number of consecutively transmitted data units to the memory is equal to or greater than a threshold number.

10. The method according to claim 8,
wherein the determining the workload includes determining the workload as the first workload upon determination that the number of consecutively received write commands is equal to or greater than a threshold number.

11. The method according to claim 8,
further comprising changing the determined workload to the second workload when performing, while the determined workload is the first workload, a background operation on the memory or reading the written data unit.

12. The method according to claim 8,
wherein the memory includes a buffer memory unit for storing the data unit, and
wherein the transmitting the data unit includes transmitting, when the determined workload is the first workload, the data unit to the memory at the first speed, during a time period in which the memory configures the written data unit by storing, in one or more of the plurality of memory units, one or more of the data units stored in the buffer memory unit.

13. The method according to claim 12,
wherein the data unit is transmitted to the memory within the time period.

14. The method according to claim 13,
wherein a first operation of storing the data unit in the buffer memory unit and a second operation of storing in one or more of the plurality of memory units, another data unit stored in the buffer memory unit are executed in parallel.

\* \* \* \* \*